Oct. 31, 1961 — R. C. WOERNER — 3,006,357
VALVES
Filed Feb. 24, 1959 — 2 Sheets-Sheet 1
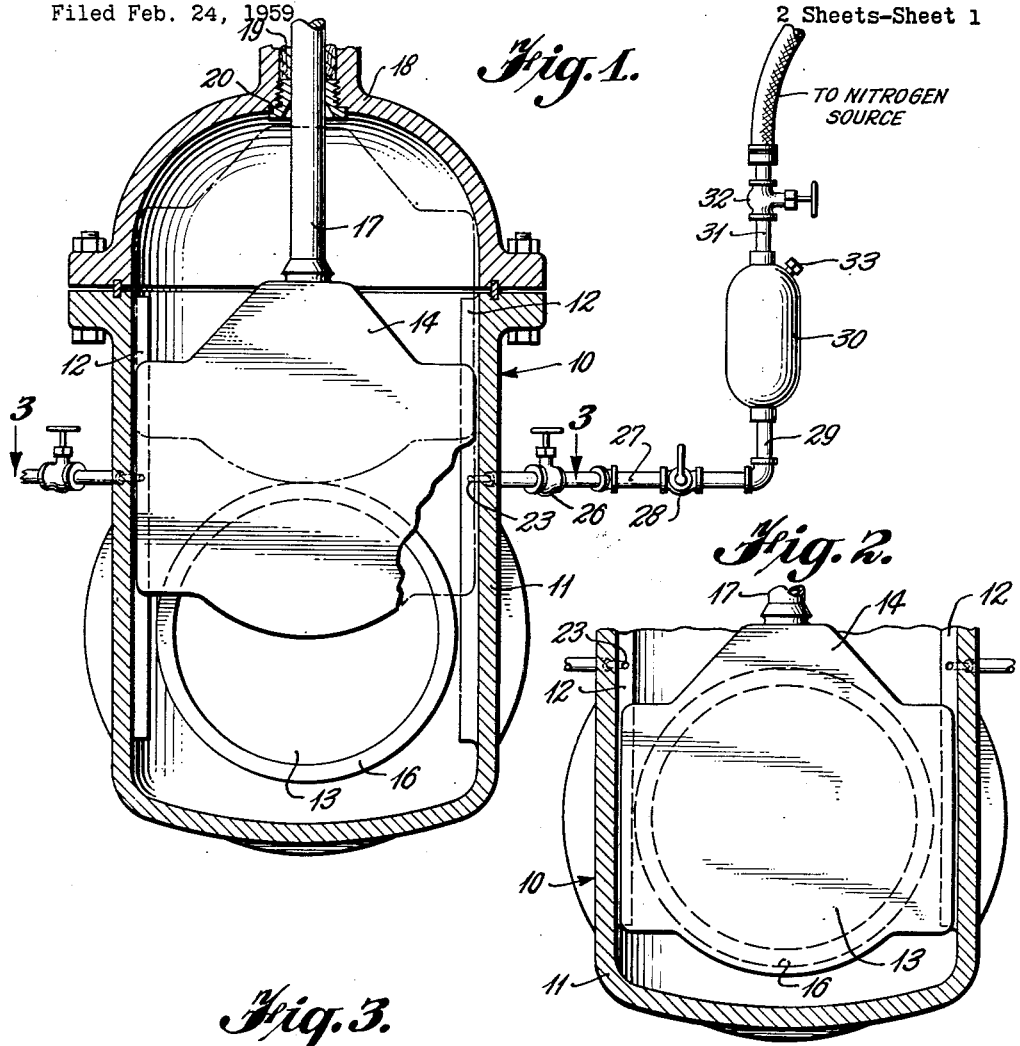
INVENTOR
Rudolph C. Woerner
BY J. Hughes Powell, Jr.
ATTORNEY Oct. 31, 1961     R. C. WOERNER     3,006,357
VALVES Filed Feb. 24, 1959     2 Sheets-Sheet 2

INVENTOR
*Rudolph C. Woerner*
BY *J. Hughes Powell, Jr.*
ATTORNEY

United States Patent Office 3,006,357
Patented Oct. 31, 1961

3,006,357
VALVES
Rudolph C. Woerner, Houston, Tex., assignor to Petro-Tex Chemical Corporation, Houston, Tex., a corporation of Delaware
Filed Feb. 24, 1959, Ser. No. 795,162
7 Claims. (Cl. 137—237)

This invention relates to valve actuation and lubricating systems, and more particularly to a gate valve construction and lubricating system for operating under high temperature conditions in which the lubricant is supplied during a stroke of the gate and then cleared from the lubricating line to prevent clogging.

In the operation of gate valves under high temperature conditions, for the control of the passage of fluent or fluidized materials undergoing heat treatment, it has been found that the ways or guide ribs upon which the gate slides in opening and closing the valve experience unusual wear due to failure of maintaining an adequate supply of lubricant on the sliding surfaces. The failure in the supply of lubricant occurs when the lubricant remains in the passageways of the hot section of the valve body where it solidifies before the next lubrication cycle takes place thereby clogging the system. When the system becomes clogged, the valve must be taken out of service, often after only a short period of operation, which increases the cost of operation by costly maintenance and repairs as well as by the loss of service due to shutdown.

The present invention overcomes these difficulties by providing a gate valve actuation for high temperature operations in which the surface of the ways for supporting the gate upon which the gate operates has lubricant feed orifices therein through which lubricant under pressure from outside of the valve body can be fed continuously to the sliding surface of the gate during one stroke of the gate and at the end of the stroke, the orifices exposed and blown free of lubricant. Advantageously, the lubrication of gate can be accomplished by depositing a measured amount of lubricant in a pressure cylinder having a line for conveying the lubricant from the cylinder to one of the orifices in the ways, the amount of lubricant being sufficient to apply a thin coating during one stroke of the gate as it slides on the ways. The lubricant is then blanketed with a gas maintained under sufficient pressure to force the lubricant against the sliding surface of the gate and deposits a thin film of lubricant during a complete stroke of the gate. At the end of the stroke, the measured amount of lubricant is exhausted and the sliding surface of the gate clears the orifice so that it is capable of being blown free of the lubricant in the line by the gas in the cylinder, thus eliminating the possibility of clogging the line or balling of the lubricant during successive strokes of the gate operating under high temperature. The blowing of the lubricant from the line disperses enough lubricant into the atmosphere of the interior of the valve body in the form of a mist to provide additional lubrication of functional parts therein, such as a light deposit on the valve seat.

Advantageously, the orifices in the ways can be angularly positioned so that lubricant being forced therethrough has an upward and inward component of force which projects the lubricant against the sliding surfaces and into the interior of the valve body. Each orifice is positioned substantially central with respect to the width of the ways and medial with respect to length of the sliding surface so that the sliding of the surface of the gate totally contacts the orifice during either the closing or the opening stroke and unobstructs the orifice at the end of the stroke.

A suitable arrangement of valves can be used for controlling all portions of the lubricating cycle. Advantageously, the control of the valves can be operatively connected to the mechanism for controlling the stroke of the gate such as by use of a cycle timer. This means of control provides for the automatic operation, in proper sequence, of the valve to charge a measured amount of lubricant into the lubricating cylinder, the valve to admit gas to pressurize the lubricating cylinder and the valve to open the feed line from the cylinder to the lubricating orifice at the proper interval of the stroke of the gate so that the measured amount of the lubricant is continuously deposited between the sliding surface of the ways. After lubrication of the ways the gas in the cylinder then blows the orifice free of lubrication at which time the system is automatically turned off until another lubrication cycle is required. Since lubrication of gate valves operating under high temperature is performed intermittently, the cycle timer may preferably be of the type which would perform the operation at given intervals of time or may be energized into operation manually at the time lubrication is desired.

Additional objects will become apparent from an examination of the drawings, description and claims.

The invention will be described further in connection with the accompanying drawings, which are to be considered as an exemplification of the invention and do not constitute limitation thereof.

In the drawings:

FIGURE 1 is a view in cross-section showing a valve body with the gate in a partially open position and a pressure operated lubrication cylinder for feeding lubricant through the orifice in the ways upon which the gate slides;

FIGURE 2 is a fragmentary section of the view shown in FIGURE 1 with the gate in a closed position and lubrication orifices exposed;

FIGURE 3 is a cross-sectional view taken on the line 3—3 of FIGURE 1 showing lubrication passageways angularly disposed to lubricate the ways upon which the gate slides.

Figure 4:
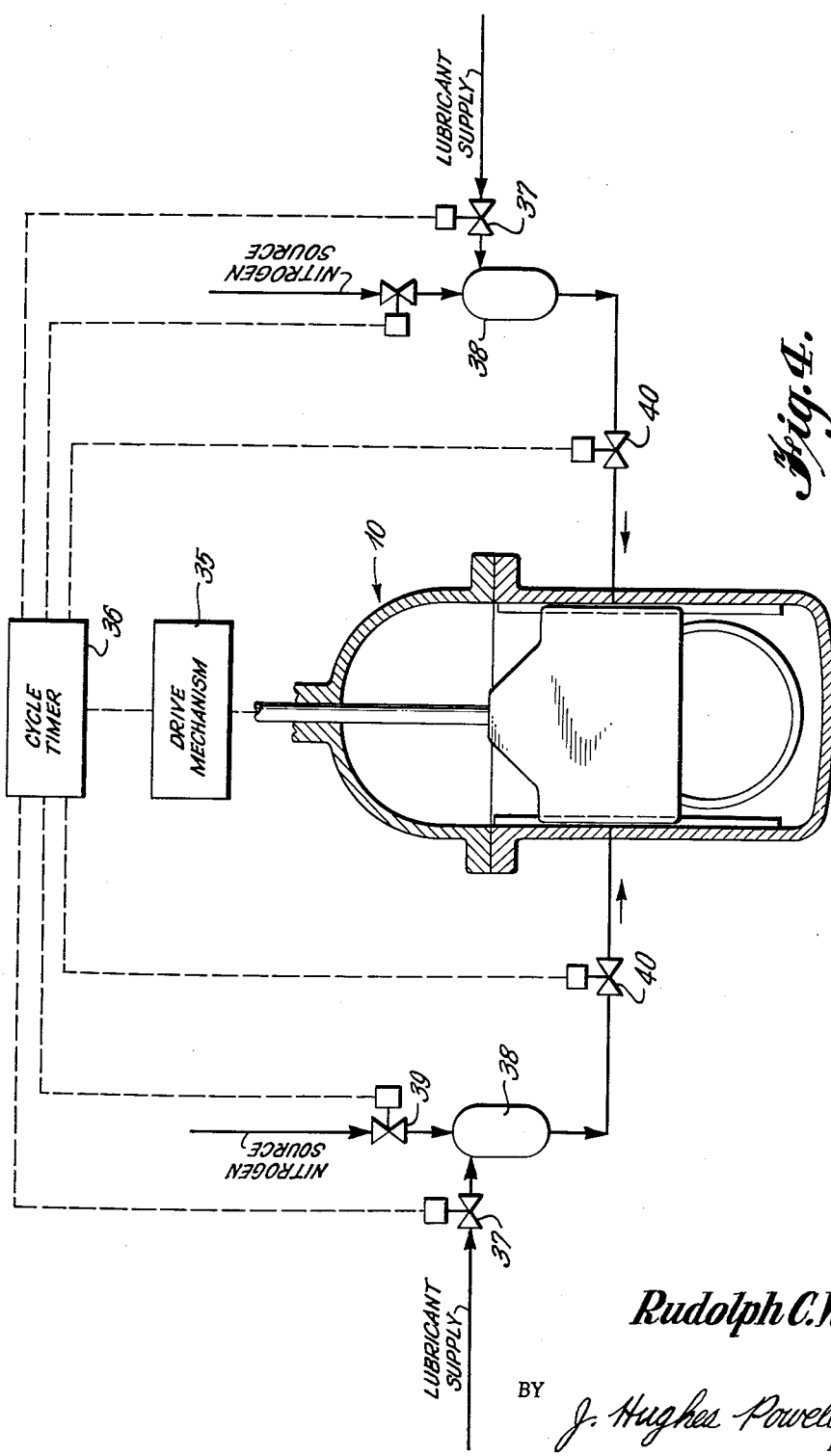
FIGURE 4 shows a schematic arrangement for automatically controlling the lubrication of the gate during one stroke of the gate.

FIGURES 1 through 4 show a conventional type of slide or gate valve 10 having a valve body 11. On each side of the valve body are oppositely positioned supporting ribs or ways 12 which extend substantially perpendicular with respect to the axis of the opening 13 defined by the body of the valve. Positioned on the ways is a gate 14 adapted to slide thereon to an open and closed position. Intermediate of the opening in the valve body is a valve seat 16 against which the surface of the gate rests in sealed relationship when the valve is slid into a closed position. The gate has a connecting rod 17 which is attached to the rearward edge thereof and is located centrally with respect to the valve body in a plane substantially parallel with the ways. The other end of the rod extends through a valve bonnet 18 in which a portion of the gate enters when the valve is in an open position. Surrounding the rod 17 where it passes through an opening in the bonnet is suitable packing 19 held in place by a gland nut 20 for ensuring a sealing of the valve body during the inward and outward movement of the rod (see FIGURE 1). Attached to the portion of the rod extending outside the valve bonnet is a gate actuating means (not shown) for moving the gate from an open to a closed position by sliding it on the ways 12.

Each of the ways 12 defines a passageway 22 which terminates in an orifice 23 in the face thereof positioned so as to direct lubricant against the undersurface of the sliding portion of the gate. As shown in the drawings the passageways are angularly arranged so as to direct the flow of lubricant inwardly towards the center of the valve. Each of the orifices is positioned substantially central with respect to the width of the ways and at a point in the ways so that at the end of the lubricating stroke each orifice is exposed and capable of being blown free of lubricant. Each orifice and its passageway extends through the valve body. Connected to each passageway is a conduit 25 which in turn is attached to a block valve 26. The block valve has a detachable coupling for connecting to second conduit 27 which in turn is connected to a cylinder discharge valve 28. A third conduit 29 connects cylinder discharge valve with a lubricant supply cylinder 30. The lubricant supply cylinder is constructed so as to maintain lubricant under pressure, the pressure being supplied through a line 31 from a pressure source (not shown) which is controlled by a valve 32. In the body of the cylinder is a plug 33 which, when removed, provides an opening for supplying the cylinder with a charge of lubricant. When the lubrication cycle has been completed, the cylinder assembly can be removed by uncoupling at the block valve with the block valve closed to seal the passageway at this point. It will be appreciated that the mechanism for supplying lubricant through orifice 23 is the same on both sides of the valve, the mechanism for only one side being shown in specific detail.

FIGURE 4 shows an alternate type of the lubrication system of this invention controlled by the movement of the gate. A gate valve 10, as heretofore described, has a drive arrangement 35 for sliding the gate to either an open or closed position. Connected to the drive arrangement and responsive therewith is a cycle timer 36 capable of operating the complete system for lubrication of the gate valve during either the opening or closing stroke of the gate. The cycle timer operates in sequence a lubricating supply valve 37 to charge a supply cylinder 38 with a measured amount of lubricant. At this point in the cycle, the timer operates valve 39 in a nitrogen gas line to allow for pressurization of the lubricant in cylinder 38. After cylinder 38 has been pressurized, the cycle timer operates cylinder discharge valve 40. The timing is so arranged that, when the cylinder discharge valves are open, the lead edges of the contact surfaces of the gate against the ways are positioned over the lubricating orifices. As the gate travels to complete a stroke, the measured amount of lubricant, sufficient to lubricate thoroughly the sliding surfaces, is fed through the orifices, and the charge of lubricant is expended when the contact surfaces of the gate have passed over the orifices. At this point, the gas under pressure in the cylinder blows the orifices free depositing a fine mist of lubricant in the gate valve body.

It will be appreciated that the lubrication system of this invention can be a single lubricating supply tank capable of forcing lubricant through the orifices in the ways in a manner heretofore described, or pressure lubricating tank or tanks may be used with a cut-off means at the end of the lubrication stroke and a separate gas supply which automatically blows the orifices free of lubricant.

In the operation of the valve shown in FIGURES 1 through 3, cylinders 30 are filled with sufficient lubricant to apply a coating to each of the ways during the closing of the gate valve. With all the valves of the lubricating system closed, valves 32 are opened first to permit the nitrogen under pressure to blanket the lubricant in both of the cylinders. The block valves 26 are then opened and the instant that the leading edges of the gate pass over the orifices, the valves 28 are opened. The pressure of the nitrogen in the cylinders forces the lubricant through the conduits into passageways 22 where it exits through orifices 23 against the sliding surfaces of the gate. The slugs of lubricant placed in cylinders 30 are calculated so as to be exhausted at the end of the stroke of the gate, at which position the orifices are exposed to the interior of the gate valve. The nitrogen gas in the cylinders then blows the passageways free of lubricant to prevent clogging so that, when another lubrication is required, the passageways will be unobstructed.

The valve actuating and lubrication system of this invention is particularly adaptable for high temperature operations, such as the regeneration of catalyst in the process of the dehydrogenation of butane to butadienes and butenes where the valve must operate under temperatures in excess of 1000° F. When a 30-inch diameter gate valve is used in such operations, a minimum of two movements of the valve gate must take place every nine minutes. By employing the lubrication system of this invention, the need for lubrication of the gate was reduced from three times a week to once a week, and in addition sticking of the valve gate and excessive wear on the sliding surface were eliminated.

This was accomplished by charging each cylinder feeding lubrication to the ways with about 10 cc. of lubricant, which in this size valve is sufficient to deposit a 1/64 inch film over each of the ways. The cylinders with lubricant therein were pressurized with nitrogen gas maintained at a pressure of 100 p.s.i. After the lubrication of the ways had been completed, the nitrogen was allowed to flow at full pressure for about ten seconds to blow each orifice and its passageway free from lubricant. With the block valve closed, the second conduit can be uncoupled and the block valve opened to blow back through the orifice and passageway for further assurance that the lubrication passageway in the hot section of the valve body is free from lubricant.

A number of lubricants can be used so long as the lubricant is one which is capable of flowing between the sliding surfaces of the ways and the gate at high temperatures. Exemplary of such lubricants are those formed from a carrier such as organo silicones, organo silicates and the like thickened with laminated foliated materials such as graphite as well as the disulfides, selenides and tellurides of molybdenum, titanium and tungsten. Also mica, vermiculite, zinc oxide, cadmium oxide, lead oxide and the like can be used in a carrier such as a high temperature base fluid where the solid particles in the carrier burnish the surface to be lubricated depositing a smooth solid lubricating film thereon.

It will be appreciated that the valve actuation and lubrication system of this invention can be used in a variety of high temperature processes, particularly where there is a tendency for the lubricating feed orifice to become clogged due to baking of lubricant in the orifice, or balling of the lubricant in the high temperature portion of the valve by the continual sliding of the gate over the orifice.

Although the present invention has been described with particularity with reference to preferred embodiments and various modifications thereof, it will be obvious to those skilled in the art, after understanding the description, that various changes and other modifications may be made therein without departing from the spirit and scope of the invention and the appended claims should therefore be interpreted to cover such changes and modifications.

What is claimed is:

1. A valve for high temperature operation comprising a valve body having inlet and outlet openings; a valve seat positioned in said body; ways positioned opposite to each other in said body; a gate for closing and opening the valve, said gate slidably mounted on said ways; lubrication passageways in said valve body terminating in orifices in the surface on which said gate slides for lubricating the contacting surfaces between said ways and gate, said orifices being exposed near the end of a lubricating stroke; and means for forcing a measured amount of lubricant through said orifices during said lubricating stroke and for blowing the orifices free from lubricant when the contacting surface of said gate has passed over said orifices.

2. The valve for high temperature operation of claim 1 in which said passageways are angularly positioned in said ways to direct lubricant inwardly towards the center of said valve to effect a spreading of the lubricant between the contact surfaces of the ways and the gate.

3. The valve for high temperature operation of claim 1 in which said means for forcing a measured amount of lubricant through said orifices is a gas under pressure which blows the orifices free of lubricant after lubrication of the contact surfaces between the ways and the gate.

4. A valve for high temperature operation comprising a valve body having inlet and outlet openings; a valve seat positioned in said body; ways positioned opposite to each other in said body; a gate for closing and opening the valve, said gate slidably mounted on said ways; lubrication passageways in said valve body terminating in orifices in the surface on which said gate slides for lubricating the contacting surfaces between said ways and gate, said orifices being exposed near the end of a lubricating stroke; a lubricating cylinder connected to each passageway for holding a measured amount of lubricant therein; a control valve positioned between each of said cylinders and said passageways for permitting the flow of lubricant through said passageway; a gaseous supply connected to each of said cylinders for maintaining the lubricant under pressure; whereby opening of said control valves allows the pressure in the cylinders to force the measured amount of lubricant through the passageways to lubricate the contacting surfaces between said ways and gate, and the closing of said control valves after said passageways are blown free of lubricant completes a lubrication cycle.

5. A gate valve lubricating system for operating at high temperature comprising a valve body having inlet and outlet openings; a valve seat positioned in said body; ways positioned opposite to each other in said body; a gate for closing and opening the valve, said gate slidably mounted on said ways; lubrication passageways in said valve body terminating in orifices in the surface on which said gate slides for lubricating the contacting surfaces between said ways and gate, said orifices being exposed near the end of the lubricating stroke; timer control means responsive to the stroke of said gate for controlling a lubricating cycle during a stroke of said gate; said control means actuating means for gaseous pressurization of lubricant in a dispensing cylinder connected to said passageway; means for releasing said lubricant under pressure from said cylinder when the leading edge of the gate passes the orifices in the ways to effect continual lubrication of the contact surface between the gate and the ways and near the end of said stroke to blow the lubrication passageways free of lubricant; and means for cutting off said gaseous pressurization after the lubricant is blown from said passageways.

6. The gate valve lubricating system for operating at high temperature of claim 5 in which said control means first actuates a means for depositing a measured amount of lubricant in said dispensing cylinder.

7. The gate valve lubricating system for operating at high temperature of claim 5 in which each of said passageways has connected thereto a dispensing cylinder.

References Cited in the file of this patent
UNITED STATES PATENTS

| | | |
|---|---|---|
| 691,975 | Schaaf | Jan 28, 1902 |
| 2,584,083 | Mellett | Jan. 29, 1952 |
| 2,630,293 | Smith | Mar. 3, 1953 |
| 2,663,290 | Walder | Dec. 22, 1953 |
| 2,807,278 | Bandy | Sept. 24, 1957 |

UNITED STATES PATENT OFFICE
CERTIFICATION OF CORRECTION

Patent No. 3,006,357                                  October 31, 1961

Rudolph C. Woerner

It is hereby certified that error appears in the above numbered patent requiring correction and that the said Letters Patent should read as corrected below.

Column 6, line 16, after "passes" insert -- over --.

Signed and sealed this 10th day of April 1962.

(SEAL)
Attest:

ERNEST W. SWIDER                                  DAVID L. LADD
Attesting Officer                                        Commissioner of Patents